Aug. 7, 1923.
L. MORINSKY
GEAR SHIFT MECHANISM
Filed Dec. 23, 1919
1,464,328
5 Sheets-Sheet 3
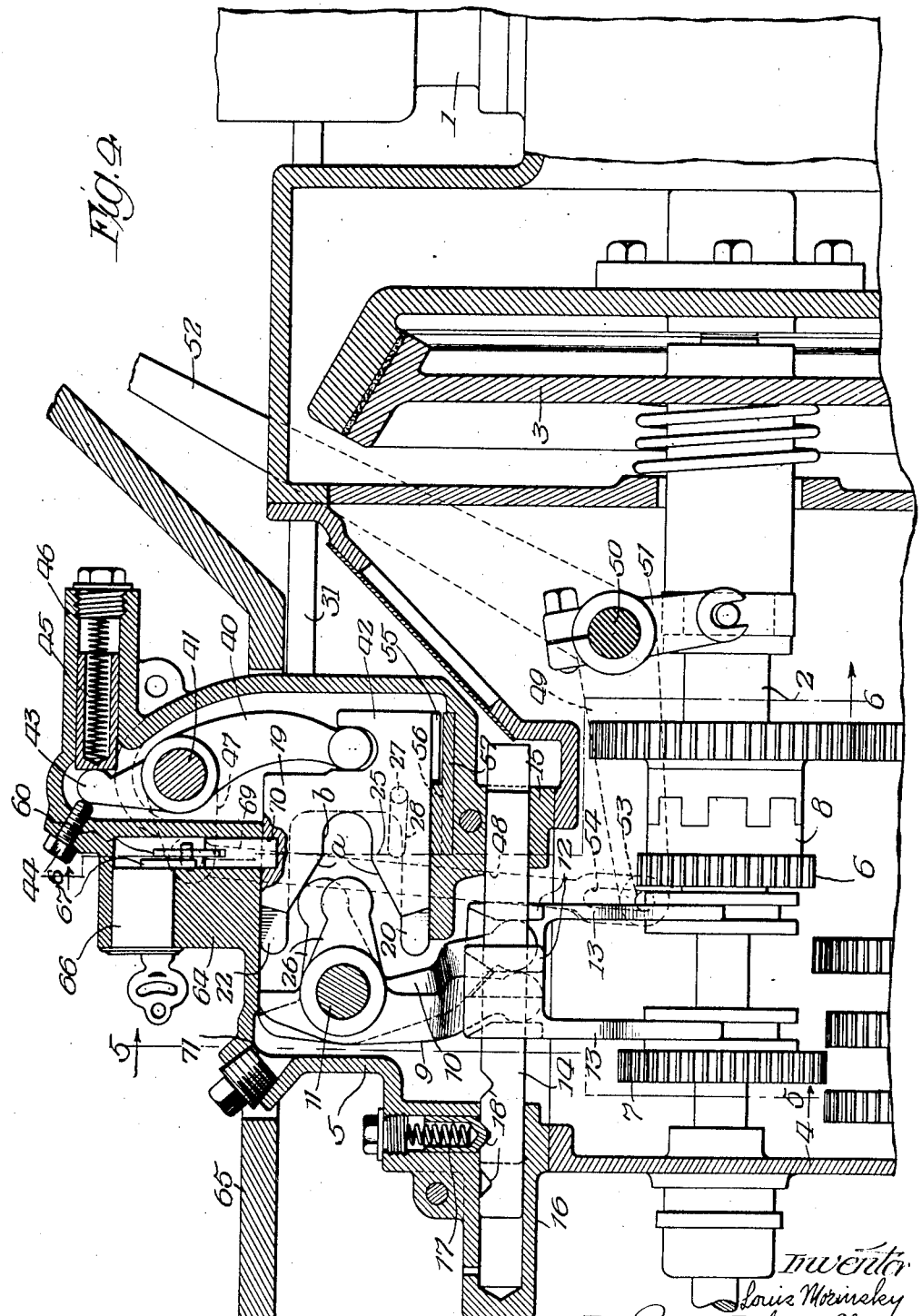

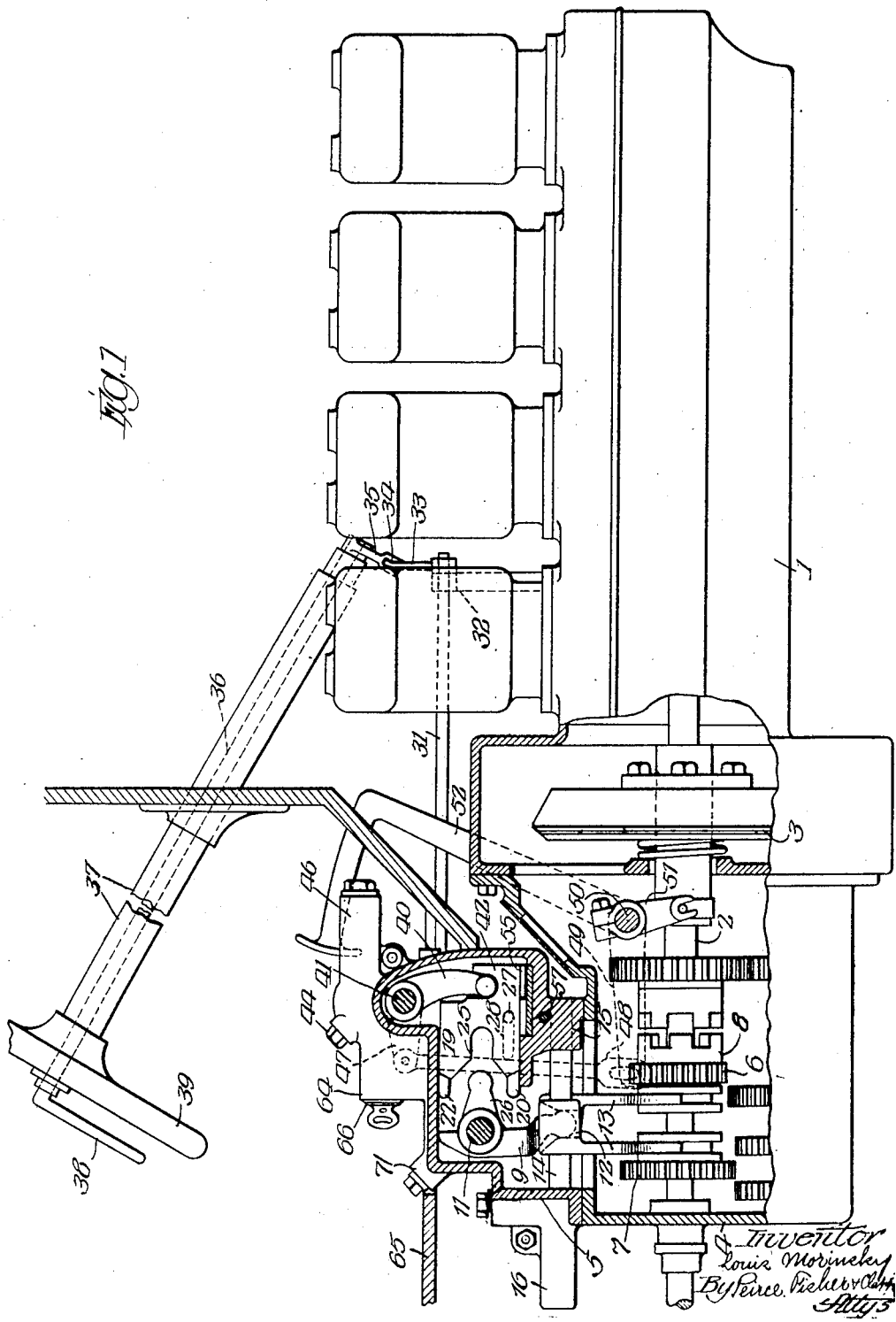

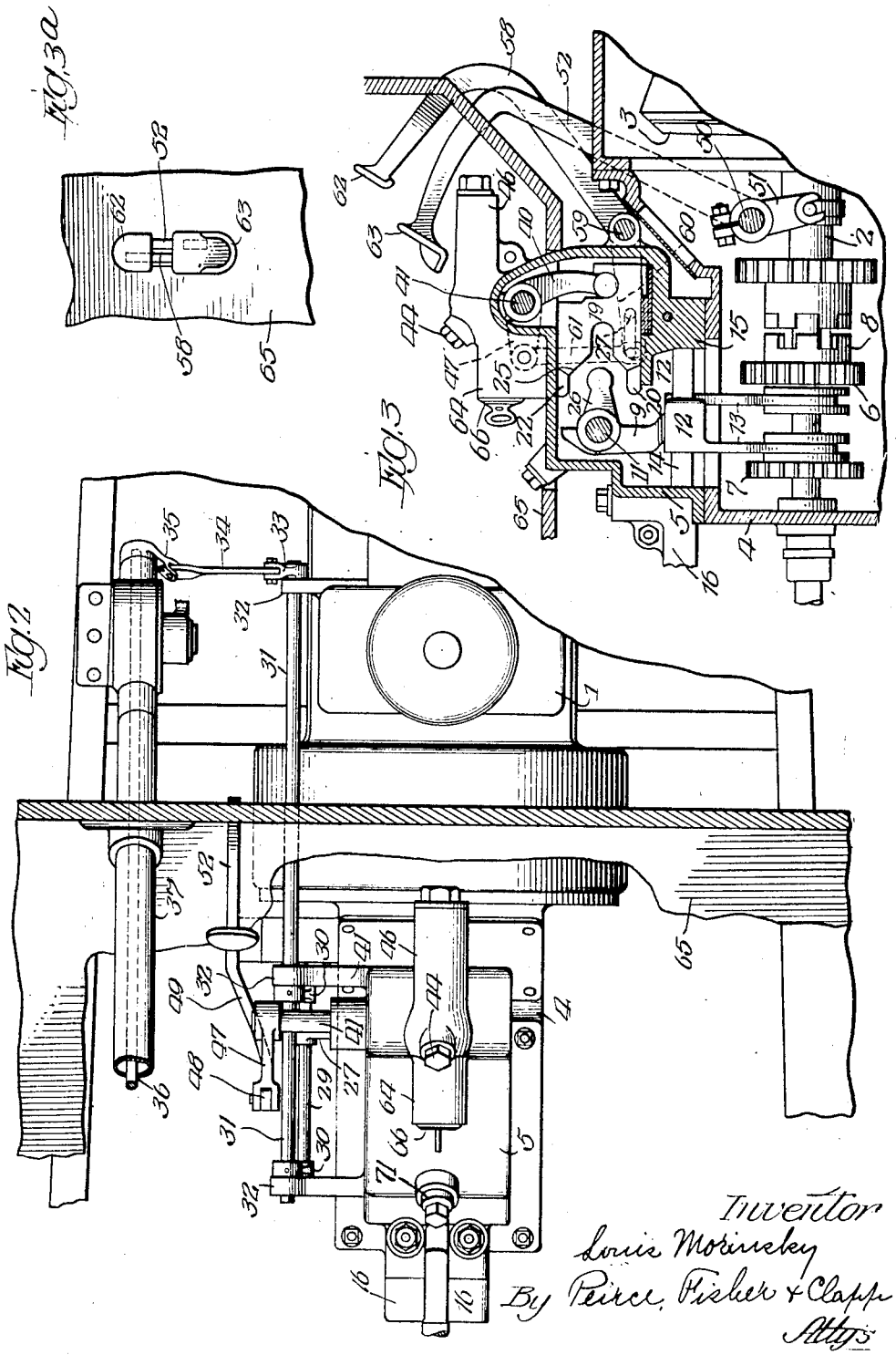

Aug. 7, 1923. 1,464,328
L. MORINSKY
GEAR SHIFT MECHANISM
Filed Dec. 23, 1919 5 Sheets-Sheet 4
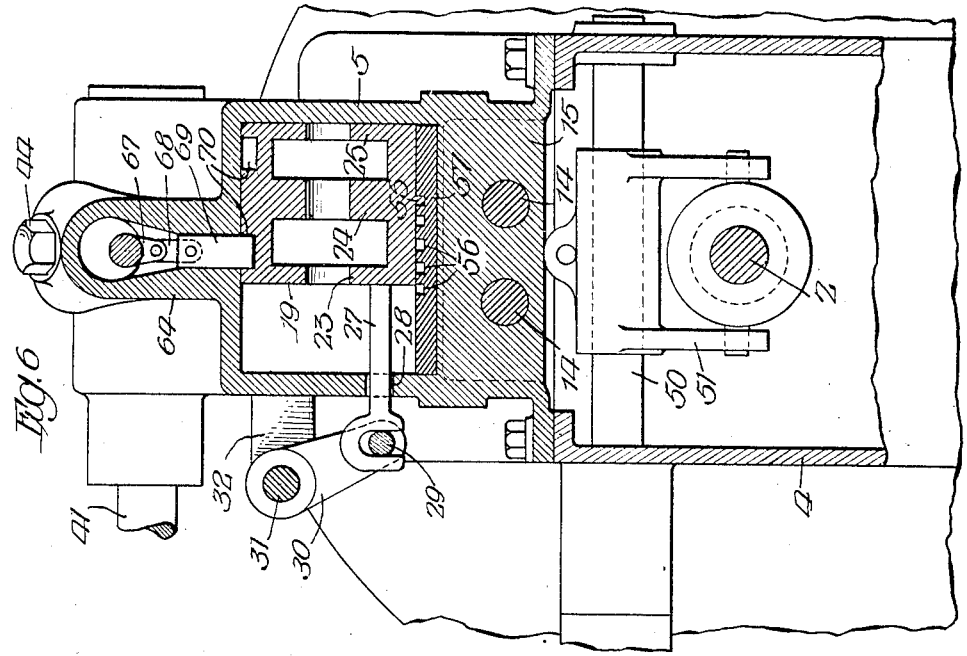
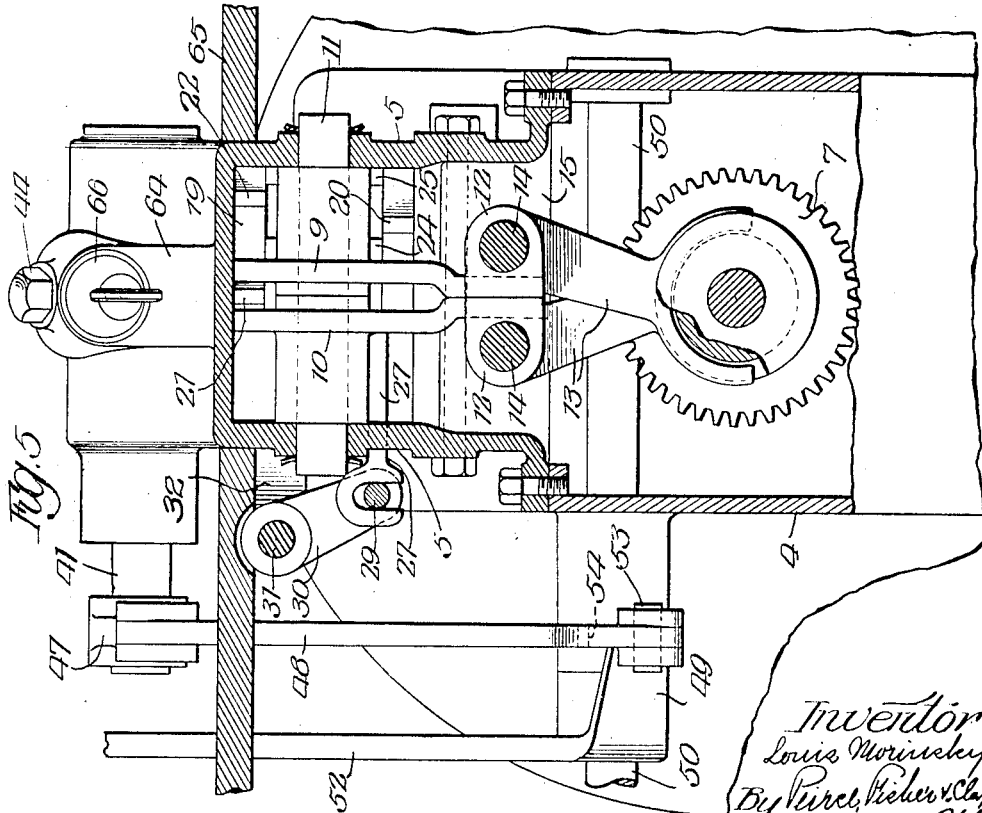
Inventor
Louis Morinsky
By Purel, Fisher & Clapp
Attys

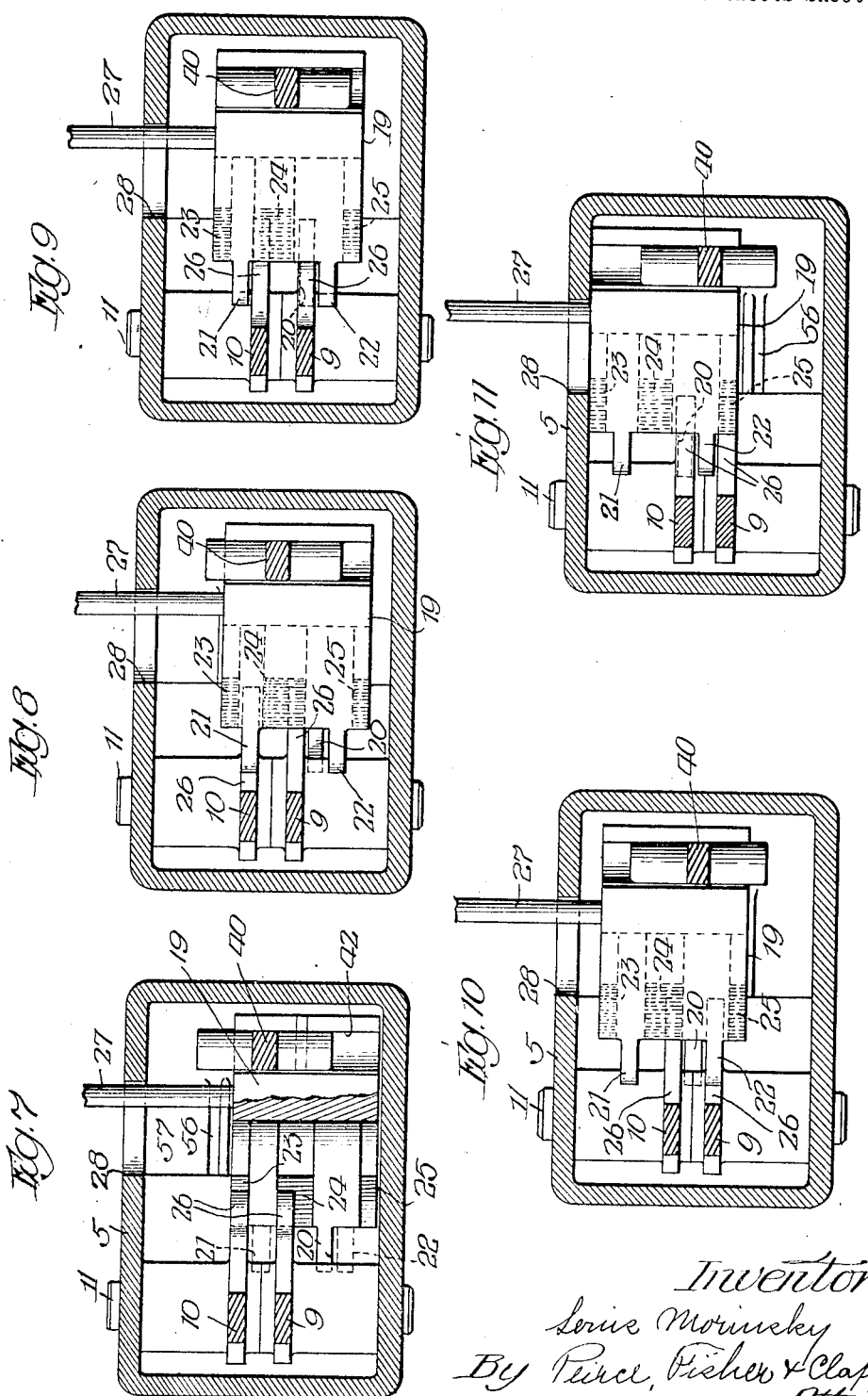

Patented Aug. 7, 1923.

1,464,328

UNITED STATES PATENT OFFICE.

LOUIS MORINSKY, OF NEW YORK, N. Y., ASSIGNOR OF NINE-TENTHS TO HENRY G. ECKSTEIN, JR., OF CHICAGO, ILL.

GEAR-SHIFT MECHANISM.

Application filed December 23, 1919. Serial No. 346,901.

*To all whom it may concern:*

Be it known that I, LOUIS MORINSKY, a citizen of Russia, and a resident of the city of New York, county of Bronx, and State of New York, have invented certain new and useful Improvements in Gear-Shift Mechanism, of which the following is a specification.

The invention relates to shift mechanism for the change speed transmission gearing of automobiles, and more particularly to that type of gear shift mechanism in which the desired setting of the gears is first selected by suitable means such as a hand lever located on or adjacent the steering wheel, and is then effected under control of a foot pedal or the like which also usually controls the clutch.

The invention seeks to provide a simple, compact mechanism in which the several gear shifters are set in proper selected positions by a common actuating member or ram having tappet and cam elements arranged respectively to set the shifters in active and neutral positions. Further objects of the invention are to provide a construction in which, after the mechanism has been once set in a given selected condition, it will remain in such condition until a new selection is made, irrespective of the number of times the clutch pedal is depressed and also to provide the actuating member or ram with spaced, neutralizing cams which, in the different selected positions of the actuator, will first neutralize one of the gear shifters and lock it in neutral position, while the other shifter is being set in active position.

The invention also seeks to provide, in connection with the shifter mechanism, an improved lock for preventing unauthorized operation of the gear shift mechanism; also to provide improved means for effecting the operation of the clutch and shift mechanism.

With the above mentioned objects in view, the invention consists in the features of improvement hereinafter set forth, illustrated in the preferred form in the accompanying drawings and more particularly pointed out in the appended claims.

In the drawings: Figure 1 is a view in elevation of the improved gear shift mechanism with the casing shown in section; Fig. 2 is a plan view; Fig. 3 is a view similar to a portion of Fig. 1 and illustrating a modification; Fig. 3ª is a detail view of parts shown in Fig. 3; Fig. 4 is an enlarged longitudinal section; Figs. 5 and 6 are transverse sections on the lines 5—5 and 6—6 respectively of Fig. 4; and Figs. 7, 8, 9, 10 and 11 are detail views illustrating different positions of the shifter actuating member or ram.

The engine 1 of the automobile operates the transmission shaft 2 through the medium of the usual clutch 3. Shaft 2 operates the car through the medium of suitable transmission gearing of selective type arranged within a casing 4. Preferably the present improved shift mechanism for controlling the operation of the transmission gearing is arranged within a cast metal casing 5 which is open at the bottom and which is mounted upon and closes an opening in the top of the transmission casing 4.

The improved shift mechanism is more particularly applicable to that type of transmission gearing having two sliding gears 6 and 7, one of which is provided with a clutch member 8, and each of which is adapted to be set in a central neutral position and be shifted in opposite directions from the neutral to two different active positions. The movements of these two gears are effected by two shift levers 9 and 10 which are arranged within the casing 5 and are preferably mounted upon a common pivot pin 11. In the form shown, the levers are provided with hubs which abut against each other and against the side walls of the casing 5, as shown in Fig. 5. The lower arms of the shift levers are provided with depending rounded ends which engage vertical slots in two blocks or members 12. The latter are provided with depending forks 13 which engage grooves in the hubs of the gears 6 and 7, and are fixed to two horizontal guide rods 14 which reciprocate longitudinally in the bearings 15 and 16 formed in the lower portion of the casing 5. Spring-pressed detents 17 cooperate with V-shaped notches 18 in the guide rods 14 to yieldingly hold the shift levers and gears in their different active and neutral positions.

A common actuating member or ram is provided for the shift levers 9 and 10 and comprises the transversely adjustable, longitudinally movable block or member 19 which is slidably mounted in the casing 5, with its central portion substantially in alignment with the pivot axis of the shift levers. Each of the shift levers is provided with upper and lower arms arranged on opposite sides of its pivotal axis, and the actuating member or ram 19 which, in the form shown, is arranged in front of the shift levers, is provided at its upper and lower portions with a series of rearwardly projecting tappets 20, 21 and 22 which are arranged to contact with the arms of the levers and shift the same in opposite directions. In the form shown, the actuating member 19 is provided with a single tappet 20 which is adapted to cooperate with the lower arm of either shift lever and, at its upper edge, the actuating member is provided with two tappets which co-act respectively with the upper arms of the levers. The actuating member or ram is also provided with a series of cams, three of these cams, 23, 24 and 25, being provided in the preferred form shown. Each cam has two oppositely inclined working faces $a$ and an intermediate central recess or seat $b$ and are arranged to cooperate with central, forwardly projecting lugs or arms 26 formed upon the shift levers 9 and 10. By aligning one of the cams with one of the shift levers and moving it toward the axis of the lever, one or the other of the inclined faces will, if the shift lever has been moved from its neutral central position to either of its active positions, engage the arm 26 of the lever and restore it and the gear actuated thereby to neutral position. Also, the engagement of the recess or seat $b$ of the cam with the rounded end of the lever arm 26 will serve to lock or hold the lever in neutral position and the parts are so arranged that whenever the actuator is operated to move one of the shift levers and its gear to active position, the other lever will at such time be positioned and locked in neutral position by one of the cams. The cams and tappets are also so arranged that as the actuating member or ram is moved toward the shift levers, one of the latter will be neutralized and locked in neutral position by one of the cams before the other lever is set in active position by one of the tappets.

As most clearly shown in Figs. 7, 8, 9, 10 and 11, the tappets and cams are disposed in different positions transversely of the actuating member or ram 19, no two of these elements being in alignment, and suitable means are provided for adjusting the actuating member transversely to selectively position the cams and tappets relatively to the shift levers. Means are also provided for reciprocating the actuating member longitudinally to effect the shift of the levers and gears.

In the form shown, a rod 27 projects laterally from the actuating member or ram 19 through a longitudinal slot 28 on the side of the casing 5. The outer forked end of this rod slidably engages an elongated crank pin or rod 29 which is carried by two cranks 30. The latter are fixed to a horizontal shaft 31 which extends fore and aft of the machine and is journaled in suitable bearings 32. An upwardly projecting crank 33 on the forward end of the shaft is connected by a link 34 to a downwardly projecting crank 35 carried by a shaft 36. The latter is preferably arranged adjacent or extends through the steering post 37 of the car and is provided at its upper end with a hand lever 38 adjacent the steering wheel 39. By adjusting the lever 38, the driver of the car can position the actuating member or ram in any one of a number of different selective positions which, in the form shown, correspond respectively to neutral, reverse and 1st, 2nd and 3rd speed positions of the transmission mechanism.

A crank arm 40 is provided for shifting the actuating member 19 longitudinally. This crank arm is fixed to a shaft 41 journaled in an upwardly projecting part of the casing 5, and its lower end is provided with a rounded or cylindrical head which engages a horizontal slot formed in a projection 42 on the forward part of the actuator. Crank arm 40 is provided with an upwardly projecting lug 43 which engages a stop screw 44 that is adjustably threaded through the wall of the casing. A spring-pressed plunger 45, guided in a sleeve 46 on the casing, engages the lug 43 and holds the crank arm 40 and actuating member 19 normally in the retracted position shown. The member 19 is, of course, free to be adjusted transversely independently of the crank arm. One projecting end of the shaft 41 is provided with a horizontal crank 47 which is connected by a depending link 48 to a horizontal crank arm 49 upon a transverse shaft 50. The shaft 50 is provided with a fork 51 for operating the clutch 3 and the usual clutch pedal 52 is connected to the shaft. The crank arm 49 is preferably provided with a pin 53 which engages an elongated slot 54 in the link 48, so that a lost motion connection is provided between the clutch pedal and the gear shifting actuator 19. The driver of the car can slightly depress the pedal to disengage the clutch without moving the gear shifting actuator, but continued pressure upon the foot pedal will move the member 19 to position the levers 9 and 10 and gears controlled thereby in accordance with the selective setting of the actuating member.

In the neutral position of the actuator, shown in Fig. 7, two of its cams 23 and 24 are respectively in line with levers 9 and 10, so that when it is operated the cams will cooperate with the lugs 26 of the levers to position and lock the levers and gears in neutral position. In any of the other positions of the actuator, as is clear from an inspection of Figs. 8, 9, 10 and 11, one of the cams will be in line with one of the levers, and one of the tappets in line with the other lever, so that one lever and gear are neutralized when the actuator is moved longitudinally, and the other lever and gear are set in the desired active condition. It should also be noted that the neutralized cams are so arranged that they will position one of the levers in neutral position and lock it in such position before the other lever is moved to an active position, so that there is no possibility of the gears being improperly set. Preferably, as shown, the lug 42 of the actuator is provided on its lower face with a rib 55 which, as the actuating member is moved longitudinally, is arranged to engage one of a series of slots 56 formed in the plate 57 and which assist in accurately positioning the actuating member or ram, although with the arrangement of cams and tappets shown, it is not possible to operatively move the actuator until it has been properly adjusted.

Instead of providing a lost motion connection between the clutch pedal and the gear shifting actuator 19, the latter may be operated by an independent pedal 58, as shown in Figs. 3 and 3ª. In this form, the pedal 58 is mounted on a shaft 59 which is journaled in suitable bearings on the casing 5, and a crank arm 60 on this shaft is connected by a link 61 to the crank arm 47 on the shaft 41. The foot-piece 62 of the pedal is arranged adjacent and in front of the foot-piece 63 of the clutch pedal 52. With this arrangement, the driver may depress the foot-piece 63 slightly to open the clutch without moving the gear shift mechanism, but when the foot-piece 63 is further depressed, the operator's foot can also engage the foot-piece 62 of the gear shifting pedal 58.

Means are also preferably provided for locking the gear shift mechanism against unauthorized manipulation. For this purpose, the casing 5 is provided with a heavy raised portion 64 which projects upwardly through the floor 65 of the car, and a key-controlled lock 66 of the Yale type is mounted therein. The barrel of the lock is provided at its inner end with a crank 67 which is connected by a link 68 to a locking bolt 69 arranged within a vertical bore formed in the projecting portion 64 of the casing. This bolt is arranged to engage either one of two seats 70 formed in the upper face of the gear shifting actuator 19 and which preferably corresponds to the neutral and reverse positions of the actuating member. By means of this locking device unauthorized operation of the transmission mechanism and consequently of the car is prevented.

Obviously changes may be made in the details set forth without departure from the essentials of the invention as defined by the claims.

I claim as my invention:

1. A shifter mechanism for change speed gearing comprising shifters, a common actuating member therefor having tappets and cams for respectively moving said shifters to active and neutral positions, said actuating member being adjustable transversely to selectively position said tappets and cams, and means for moving said member longitudinally to actuate said shifters, substantially as described.

2. A shifter mechanism for change speed gearing comprising shifters, a common actuating member therefor having tappets and cams for respectively moving said shifters to active and neutral positions, said actuating member being adjustable transversely to selectively position said tappets and cams, and means for moving said member longitudinally to actuate said shifters, said cams having means for locking said shifters in neutral position and being arranged to position said shifters in advance of said tappets as said member is moved longitudinally, substantially as described.

3. A shifter mechanism for change speed gearing comprising gear shifters, a common longitudinally movable, actuating ram therefor having transversely spaced tappets and cams for respectively moving said shifters to active and neutral positions, means for adjusting said ram transversely to selectively position said tappets and cams, and means for reciprocating said ram longitudinally to position said shifters, each of said cams having means for locking a shifter in neutral position as another shifter is moved to active position by one of said tappets, substantially as described.

4. A shifter mechanism for change speed gearing comprising two shifting levers, a common actuating member having cams for neutralizing said levers and tappets for moving each of the levers in opposite directions from neutral position, said member being transversely adjustable to selectively position said cams and tappets, and means for moving said member toward the pivotal axes of said levers to actuate the same, substantially as described.

5. A shifter mechanism for change speed gearing comprising two gear shifting levers, a common actuating member having cams for neutralizing said levers and tappets for moving each of the levers in opposite directions from neutral position, said member being transversely adjustable to selectively position said cams and tappets, and means for moving said member toward the pivotal axes of said levers to actuate the same, said cams being arranged to position said levers in advance of said tappets as said member is moved, substantially as described.

6. A shifter mechanism for change speed gearing comprising two gear shifting levers, a common actuating member having cams for neutralizing said levers and tappets for moving each of the levers in opposite directions from neutral position, a hand lever and connections for adjusting said member transversely to selectively position said tappets and cams, and a foot-pedal and connections for moving said member toward the pivotal axes of said levers to actuate the same, said neutralizing cams being arranged to position and lock one of said levers before the other lever is set in active position by one of said tappets, substantially as described.

7. A shifter mechanism for change speed gearing comprising two gear shifting levers having arms on opposite sides of their pivots and intermediate lugs, and a common actuator having transversely spaced gear setting tappets and neutralizing cams arranged to act on said arms and lugs respectively, said member being transversely adjustable to selectively position said tappets and cams, and longitudinally movable toward the pivots of said arms to actuate the same, substantially as described.

8. A shifter mechanism for change speed gearing comprising two gear shifting levers having arms on opposite sides of their pivots and intermediate lugs, and a common actuator having transversely spaced, gear setting tappets and neutralizing cams arranged to act on said arms and lugs respectively, said member being transversely adjustable to selectively position said tappets and cams, and longitudinally movable toward the pivots of said arms to actuate the same, said cams having oppositely inclined cam faces and central locking notches for engaging said lugs, substantially as described.

9. The combination with a transmission mechanism including a clutch, a speed change gearing, an actuating member for shifting said gearing, means for selectively controlling said actuating member, and separate foot pedals and connections for operating said clutch and said member, said pedals being arranged adjacent each other and adapted to be successively engaged by the operator's foot, substantially as described.

10. A shifter mechanism for change speed gearing comprising two shifters, each movable in opposite directions from an intermediate neutral position to active positions, a common actuating ram movable to and from said shifters and having transversely spaced setting devices and neutralizing cams for actuating and moving said shifters to their active and neutral positions respectively, means for adjusting said ram transversely to selectively position said setting device and cams, and means for reciprocating said ram to position said shifters, each of the cams of said ram having oppositely inclined working faces and an intermediate locking portion arranged to hold one of said shifters in a neutral position, as the other is moved to an active position.

11. A shifter mechanism for change speed gearing comprising a plurality of shifters, and an operating member therefor having a recess with opposed proximate portions for neutralizing the shifters and remote portions for displacing the shifters from the neutral position.

12. A shifter mechanism for change speed gearing comprising a pair of shifters, a common actuating member therefor having a series of differentially disposed contact portions simultaneously and selectively operable to simultaneously displace one of the shifters from neutral position and return the other shifter to neutral position and means operable at one extremity of the movement of the actuating member to return and simultaneously hold both shifters in neutral position.

LOUIS MORINSKY.